United States Patent
Ozden et al.

(10) Patent No.: US 10,696,892 B2
(45) Date of Patent: Jun. 30, 2020

(54) ENHANCEMENTS OF GELLED HYDROCARBON SYSTEMS

(71) Applicant: Saudi Arabian Oil Company, Dhahran (SA)

(72) Inventors: Sehmus Ozden, Houston, TX (US); Leiming Li, Sugar Land, TX (US); Ghaithan A. Al-Muntasheri, Katy, TX (US); Feng Liang, Cypress, TX (US)

(73) Assignee: Saudi Arabian Oil Company, Dayton (SA)

( * ) Notice: Subject to any disclaimer, the term of this patent is extended or adjusted under 35 U.S.C. 154(b) by 105 days.

(21) Appl. No.: 15/609,987

(22) Filed: May 31, 2017

(65) Prior Publication Data

US 2017/0349815 A1 Dec. 7, 2017

Related U.S. Application Data

(60) Provisional application No. 62/346,622, filed on Jun. 7, 2016.

(51) Int. Cl.
| | |
|---|---|
| *C09K 8/64* | (2006.01) |
| *C09K 8/82* | (2006.01) |
| *C09K 8/32* | (2006.01) |
| *E21B 43/26* | (2006.01) |
| *E21B 43/267* | (2006.01) |

(52) U.S. Cl.
CPC .............. *C09K 8/64* (2013.01); *C09K 8/32* (2013.01); *C09K 8/82* (2013.01); *E21B 43/26* (2013.01); *E21B 43/267* (2013.01); *C09K 2208/10* (2013.01)

(58) Field of Classification Search
CPC .......... C09K 8/805; C09K 8/536; C09K 8/64; C09K 8/70; C09K 8/92; C09K 8/035; C09K 8/524; C09K 8/80; C09K 8/516; C09K 8/68; C09K 2208/28; C09K 8/34; C09K 8/62; C09K 2208/34; C09K 2208/32; C09K 8/03; C09K 8/08; C09K 8/528; C09K 8/60; C09K 8/72; C09K 2208/22; C09K 8/20; C09K 8/685; C09K 8/32; C09K 8/605; C09K 2208/10; C09K 2208/20; C09K 8/40; C09K 8/502; C09K 8/54; C09K 8/665; C09K 8/82; C09K 8/86; C09K 8/05; C09K 8/06; C09K 8/24; C09K 8/44; C09K 8/508; C09K 8/58; C09K 8/845; C09K 2208/18; C09K 8/04; C09K 8/36; C09K 2208/12; C09K 8/42; C09K 8/512; C09K 8/57; C09K 8/5756; C09K 8/607; C09K 8/74; C09K 8/94; C09K 2208/02; C09K 2208/08; C09K 2208/26; C09K 2208/30; C09K 8/38; C09K 8/5045; C09K 8/506; C09K 8/518; C09K 8/52; C09K 8/575; C09K 8/602; C09K 8/604; C09K 8/608; C09K 8/66; C09K 8/703; C09K 8/706
See application file for complete search history.

(56) References Cited

U.S. PATENT DOCUMENTS

| | | | |
|---|---|---|---|
| 5,647,900 A * | 7/1997 | Smith ................... | C07F 15/025 106/285 |
| 5,663,122 A | 9/1997 | Mueller et al. | |
| 5,807,812 A | 9/1998 | Smith et al. | |
| 6,024,170 A | 2/2000 | McCabe et al. | |
| 6,149,693 A * | 11/2000 | Geib ...................... | C09K 8/685 44/270 |
| 6,511,944 B2 * | 1/2003 | Taylor ...................... | C09K 8/64 507/237 |
| 7,026,272 B2 | 4/2006 | Reddy et al. | |
| 7,572,382 B2 | 8/2009 | Mesher et al. | |
| 7,696,131 B2 | 4/2010 | Oyler et al. | |
| 7,972,996 B2 | 7/2011 | Ghesner et al. | |
| 8,377,854 B2 | 2/2013 | Delgado et al. | |
| 8,567,499 B2 | 10/2013 | Li et al. | |
| 2002/0165101 A1 | 11/2002 | Taylor et al. | |
| 2003/0045605 A1* | 3/2003 | Thompson ............... | C08K 5/00 523/130 |
| 2004/0180794 A1 | 9/2004 | Reddy et al. | |

(Continued)

FOREIGN PATENT DOCUMENTS

CA 2239318 A1 11/1999

OTHER PUBLICATIONS

International Search Report and Written Opinion pertaining to PCT/US2017/035230 dated Jul. 26, 2017.

(Continued)

*Primary Examiner* — Kumar R Bhushan (74) *Attorney, Agent, or Firm* — Dinsmore & Shohl LLP (57) ABSTRACT

Gelled hydrocarbon fracturing fluids and their methods of preparation and use are provided. The gelled hydrocarbon fracturing fluid includes a hydrocarbon fluid, a phosphate ester, a crosslinker and a viscosifier. The crosslinker may include iron, aluminum, or combinations thereof and the viscosifier may include clay, graphite, carbon nanotubes, metallic oxide nanoparticles, and combinations thereof. The method of preparation includes combining a hydrocarbon fluid, phosphate ester, and crosslinker to form a baseline fluid. A viscosifier is added to the baseline fluid to form a gelled hydrocarbon fracturing fluid. The method of use includes treating a subterranean formation by contacting a subterranean formation with a gelled hydrocarbon fracturing fluid and generating at least one fracture in the subterranean formation.

17 Claims, 8 Drawing Sheets

(56) References Cited

U.S. PATENT DOCUMENTS

| | | | |
|---|---|---|---|
| 2007/0277977 A1* | 12/2007 | Mesher | C09K 8/64 166/267 |
| 2009/0305914 A1 | 12/2009 | Li et al. | |
| 2010/0048429 A1 | 2/2010 | Dobson, Jr. et al. | |
| 2010/0230357 A1* | 9/2010 | McCartney | B01J 41/02 210/669 |
| 2011/0056748 A1* | 3/2011 | Browne | C09K 8/145 175/5 |
| 2012/0283148 A1* | 11/2012 | Dobson, Jr. | C09K 8/04 507/103 |
| 2013/0000916 A1 | 1/2013 | Li | |
| 2014/0076552 A1 | 3/2014 | Murphy | |
| 2014/0090847 A1 | 4/2014 | Li et al. | |

OTHER PUBLICATIONS

Examination Report pertaining to Application No. GC2017-33523 dated Dec. 17, 2019.
Office Action pertaining to European Patent Application No. 17729677.9 dated Jan. 27, 2020.

\* cited by examiner

ENHANCEMENTS OF GELLED HYDROCARBON SYSTEMS

CROSS-REFERENCE TO RELATED APPLICATIONS

This application claim priority to U.S. Provisional Application Ser. No. 62/346,622, filed Jun. 7, 2016, which is incorporated by reference in its entirety.

TECHNICAL FIELD

Embodiments of the present disclosure generally relate to fluids and methods of preparation and use of fluids for treating subterranean formations. Specifically, embodiments of the present disclosure relate to enhanced gelled hydrocarbon systems, including gelled hydrocarbon fluids, methods of their preparation, and methods of using gelled fluids to treat subterranean formations.

BACKGROUND

Drilling fluids in the oil and gas industries perform a myriad of tasks, including propagating fractures, cleaning a well, holding cuttings in suspension, reducing friction, lubricating the drilling tools, maintaining stability of a wellbore, and preventing fluid loss, to name a few. While water-based fluids can be environmentally friendly and cost-efficient, they corrode metal tools and disintegrate clays and salts, making them an undesirable choice for many applications. Hydrocarbon-based fluids may be used as an alternative; however, typical hydrocarbon-based fracturing fluids must use extensive amounts of phosphate esters with metal crosslinkers to create a fluid with a sufficient viscosity to support proppant particles. A proppant is a material added to hydraulic fracturing fluid to keep fractures open by "propping" open the fracture during or following a subterranean treatment. Unfortunately, phosphate esters have been linked to refinery equipment fouling, referring to the build-up of unwanted deposits and corrosion that can lead to equipment malfunction, and even equipment failure.

SUMMARY

Accordingly, a need exists for hydrocarbon fluids and methods for treating subterranean formations with hydrocarbon fluids that contain a reduced amount of phosphate while still providing sufficiently viscous fluid.

The present disclosure addresses these needs by providing gelled hydrocarbon fracturing fluids and methods of preparing and using gelled hydrocarbon fracturing fluids in which the provided combination of hydrocarbon fluid, phosphate ester, crosslinker and viscosifier may allow for less phosphate ester to be used while still maintaining a suitable viscosity.

In accordance with one embodiment of the present disclosure, a gelled hydrocarbon fracturing fluid is provided. The gelled hydrocarbon fracturing fluid may comprise a hydrocarbon fluid, a phosphate ester, a crosslinker comprising a component selected from the group consisting of iron, aluminum, and combinations thereof, and a viscosifier comprising a component selected from the group consisting of clay, graphite, carbon nanotubes, metallic oxide nanoparticles, and combinations thereof.

In accordance with another embodiment of the present disclosure, a method for preparing a gelled hydrocarbon fluid is provided. The method may include combining a hydrocarbon, a phosphate ester, and a crosslinker comprising a component selected from the group consisting of iron, aluminum, and combinations thereof to form a baseline fluid, and adding a viscosifier comprising a component selected from the group consisting of clay, graphite, carbon nanotubes, metallic oxide nanoparticles, and combinations thereof, to the baseline fluid to form the gelled hydrocarbon fracturing fluid.

In accordance with another embodiment of the present disclosure, a method of treating a subterranean formation is provided. The method may include contacting the subterranean formation with a gelled hydrocarbon fracturing fluid comprising a hydrocarbon, a phosphate ester, a crosslinker comprising a component selected from the group consisting of iron, aluminum, and combinations thereof, and a viscosifier comprising a component selected from the group consisting of clay, graphite, carbon nanotubes, metallic oxide nanoparticles and generating at least one fracture in the subterranean formation.

Although the concepts of the present disclosure are described within with primary reference to some specific configurations for gelled hydrocarbon systems for hydraulic fracturing, it is contemplated that the concepts are applicable to systems having any configuration or methodology.

BRIEF DESCRIPTION OF THE DRAWINGS

The following detailed description of specific embodiments of the present disclosure can be best understood when read in conjunction with the following drawings, in which.

DETAILED DESCRIPTION

Embodiments of the present disclosure are directed to gelled hydrocarbon fracturing fluids, methods of preparing gelled hydrocarbon fracturing fluids, and methods of treating a subterranean formation with gelled hydrocarbon fracturing fluids. As a non-limiting example, the fracturing fluids of the present disclosure may be used in the oil and gas drilling industries, such as for drilling in oil and gas wells.

Oil and gas wells may be formed in subterranean portions of the Earth, sometimes referred to as subterranean geological formations. The wellbore may serve to connect natural resources, such as petrochemical products, to a ground level surface. In some embodiments, a wellbore may be formed in the geological formation, such as by a drilling procedure. To drill a subterranean well or wellbore, a drill string including a drill bit and drill collars to weight the drill bit may be inserted into a predrilled hole and rotated to cut into the rock at the bottom of the hole, producing rock cuttings.

To create or propagate a fracture in a subterranean formation, hydraulic fracturing fluid may be pumped into the wellbore at a high rate to increase the pressure at the perforations to a value that is greater than the breakdown pressure of the formation (typically the sum of the in-situ stress and the tensile strength of the rock). As the formation is broken down and the fracture is created, propping agents, known as proppants, are transported by the fracturing fluid into the fracture to keep the formation from closing, while the fluid is allowed to flow back to the surface. The proppants are typically dense, hard particles, such as sand, ceramic, bauxite, resin, glass, or plastic materials. Conventional hydrocarbon-based fracturing fluids with low quantities of phosphate esters have such a thin viscosity that the proppant particles added to the fluid may not suspend in the fluid, but rather immediately sink to the bottom. As a result, the proppants are not pumped into the fracture until the last of the fluid has been used, which risks premature closure of the fracture.

The present embodiments may overcome these difficulties by providing gelled hydrocarbon fracturing fluids containing a hydrocarbon fluid, a phosphate ester, a crosslinker having a component selected from the group consisting of iron, aluminum, and combinations thereof, and a viscosifier having a component selected from the group consisting of clay, graphite, carbon nanotubes, metallic oxide nanoparticles, and combinations thereof. Without being bound by any particular theory, this combination of hydrocarbon fluid, phosphate ester, crosslinker and viscosifier may allow for a reduced quantity of phosphate ester to be utilized while maintaining a sufficient fluid viscosity.

The hydrocarbon fluid may be any suitable hydrocarbon-based fluid. As used throughout the disclosure, "hydrocarbon fluid" refers to an organic fluid or solvent containing chemicals or chemical moieties comprising hydrogen and carbon. The hydrocarbon fluid may be used to overcome water sensitivities in some subterranean formations by providing a non-aqueous alternative to a water-based hydraulic fluid. 'Water-less' fluids are more environmentally sound, minimizing depletion of natural-source freshwater often consumed in fracturing applications. Additionally, use of hydrocarbon fluid may mitigate problems associated with water and foam systems. Fracturing fluids are typically hydraulically injected into a wellbore that penetrates the subterranean formation and are propelled against the formation strata by high pressure, forcing the strata to crack and fracture. With water-based fluids, high water saturation near the fracture face can reduce the relative permeability of the fluids to oil and gas, as oil and water naturally repel one another, which can lower the overall hydrocarbon production. Water-based fluids can also induce issues such as clay swelling, clay migration, scale formation, and emulsion blockage. Similarly, water-based fracturing fluids reduce conductivity and cause damage by depositing a thick polymer filter cake on fracture walls. Thus, embodiments of the disclosure utilize a hydrocarbon-based fluid. The gelled hydrocarbon fluids of the present disclosure may be compatible with the water-sensitive formations and may prevent the operational issues previously mentioned. Moreover, the gelled hydrocarbon fluids of the present disclosure may minimize impairment to fracture conductivity while carrying, in some embodiments, up to 18 pounds per gallon (lb/gal) of proppant.

Many fluids are suitable for use as the hydrocarbon fluid. In some embodiments, the hydrocarbon fluid may contain olefins, kerosene, diesel oil, gas oil (also known as gas condensate), fuel oil, other petroleum distillates, or mixtures of crude oil. The hydrocarbon fluid may include diesel fuel, alone, or in combinations with other hydrocarbon fluids.

The amount of hydrocarbon fluid may vary based on the desired amount of gelled hydrocarbon fracturing fluid. While any amount of hydrocarbon fluid may be suitable, in some embodiments, the gelled hydrocarbon fracturing fluid may comprise from 1 to 500 milliliters (mL) of hydrocarbon fluid. For instance, the gelled hydrocarbon fracturing fluid may comprise from 1 to 300 mL, from 1 to 200 mL, from 1 to 100 mL, from 1 to 50 mL, or 1 to 25 mL hydrocarbon fluid. In other embodiments, the hydrocarbon fluid may comprise over 500 mL, such as 750 mL, 1,000 mL, or 1,500 mL of hydrocarbon fluid. Again, the amount of hydrocarbon fluid utilized will vary based on the desired application and the relative amounts of the other components present in the gelled hydrocarbon fracturing fluid (such as, for instance, the concentration of phosphate ester, crosslinker, and viscosifier).

As previously stated, the gelled hydrocarbon fracturing fluid may be formulated such that the amount of phosphate ester is minimized while retaining the viscosity necessary for a fracturing fluid. The gelled hydrocarbon fracturing fluid may comprise from 1 to 100 gallon per thousand gallons (gpt; 1 gpt is equal to 0.1% by volume, or 1 mL/L) of phosphate ester. More specifically, in the context of gelled fluids, "gpt" refers to gallons of a component of the gelled fluid (such as phosphate) per thousand gallons of organic solvent to which the component was added (such as hydrocarbon fluid). In some embodiments, the gelled hydrocarbon fracturing fluid may comprise from 1 to 50 gpt of phosphate ester, from 1 to 20 gpt of phosphate ester, from 1 to 10 gpt phosphate ester, or from 5 to 10 gpt of phosphate ester. In some embodiments, the gelled hydrocarbon fracturing fluid may contain less than or equal to 100 gpt, less than or equal to 50 gpt, less than or equal to 20 gpt, or less than or equal to 10 gpt of phosphate ester, based on the total weight of the hydrocarbon fluid in thousand gallons.

As used throughout this disclosure, the term "phosphate" refers to the total concentration of $PO_4^{3-}$, which may exist as an ion, an ionic salt, in an ionic compound, or in a composition. In some embodiments, the gelled hydrocarbon fracturing fluid may comprise at least 20% less of the phosphate when compared to compositions that do not contain a crosslinker selected from the group consisting of iron, aluminum, and combinations thereof, a viscosifier selected from the group consisting of clay, graphite, carbon nanotubes, metallic oxide nanoparticles, and combinations thereof, or both. In some embodiments, the gelled hydrocarbon fracturing fluid may comprise at least 40% less, or at least 30% less, or at least 15% less phosphate when compared to compositions that do not contain the crosslinker including a component selected from the group consisting of iron, aluminum, and combinations thereof, a viscosifier including a component selected from the group consisting of clay, graphite, carbon nanotubes, metallic oxide nanoparticles, and combinations thereof, or both. Commercial examples of suitable phosphates include, but are not limited to, EG-2 from Ethox Chemicals, (Greenville, S.C.) and ECONO OG-1 from Economy Polymers and Chemicals (Houston, Tex.).

The gelled hydrocarbon fracturing fluid also includes a crosslinker. The crosslinker may include at least one component selected from the group consisting of iron, aluminum, and combinations thereof. For instance, the crosslinker may include a polyvalent metal salt of iron or aluminum. In some embodiments, the crosslinker may comprise ferric iron ($Fe^{3+}$). Ferric iron refers to an iron cation in a +3 oxidation state. In some embodiments, the crosslinker may comprise aluminum chloride, aluminum isopropoxide, or combinations thereof. The crosslinker may, in some embodiments, comprise aluminum alkanoate. Aluminum alkanoates include aluminum alkyl tricarboxylate salts, such as those having alkyl groups of from 1 to 40 carbon atoms, from 1 to 20 carbon atoms, from 5 to 20 carbon atoms, or from 5 to 10 carbon atoms, for example. The alkyl groups of the aluminum alkanoates may consist of saturated, straight, or branched hydrocarbon chains. A non-limiting example of an aluminum alkanoate is aluminum tris(2-ethylhexanoate), also known as aluminum octoate. Non-limiting commercial examples of suitable crosslinker may include EA-3 from Ethox Chemicals, (Greenville, S.C.) or ECONO OG-XL from Economy Polymers and Chemicals (Houston, Tex.). Without being bound by theory, the crosslinker may strengthen the 3-dimensional network of the gelled hydrocarbon fracturing fluid through utilizing attractive forces, such as van der Waals-like forces, to crosslink the fluid.

Various amounts of crosslinker are considered suitable for use in embodiments of the gelled hydrocarbon fracturing fluid. In some embodiments, the gelled hydrocarbon fracturing fluid may comprise from 1 gpt to 100 gpt of crosslinker. For instance, the gelled hydrocarbon fracturing fluid may comprise from 1 gpt to 50 gpt, from 1 gpt to 20 gpt, or from 1 to 10 gpt, or from 5 gpt to 10 gpt of crosslinker. In one or more embodiments, the addition of the crosslinker may raise the overall viscosity of the gelled hydrocarbon fracturing fluid, which, as mentioned previously, may aid in proppant suspension and fracturing subterranean formations.

In some embodiments, the gelled hydrocarbon fracturing fluid may comprise a viscosifier selected from the group consisting of clay, graphite, carbon nanotubes, metallic oxide nanoparticles, and combinations thereof. The viscosifier may increase the viscosity of the gelled hydrocarbon fracturing fluid, which, as mentioned, may result in low formation damage and good proppant suspending. Various amounts of the viscosifier are suitable for use in embodiments of the gelled hydrocarbon fracturing fluid. In some embodiments, the gelled hydrocarbon fracturing fluid may comprise from 1 pound per thousand gallons (ppt; 1 ppt is equal to about 0.12 g/L) to 500 ppt of viscosifier. In the context of gelled fluids, the unit "ppt" refers to pounds of a component of the gelled fluid (such as viscosifier) per thousand gallons of organic solvent to which the component was added (such as hydraulic fluid). For example, the gelled hydrocarbon fracturing fluid may comprise from 1 ppt to 250 ppt, 1 ppt to 100 ppt, or from 1 ppt to 50 ppt of viscosifier, or from 1 ppt to 20 ppt, or from 15 ppt to 50 ppt. In one or more embodiments, the gelled hydrocarbon fracturing fluid may comprise from 15 ppt to 35 ppt, or from 25 ppt to 45 ppt, or from 20 ppt to 30 ppt.

Various types of clay, graphite, carbon nanotubes and metallic oxide nanoparticles are suitable for the viscosifier. In some embodiments, the viscosifier may be a clay. In some embodiments, the clay may comprise montmorillonite. Montmorillonite is a smectite clay comprised of phyllosilicate mineral with the repeating formula $(Na,Ca)_{0.33}(Al,Mg)_2(Si_4O_{10})(OH)_2 \cdot nH_2O$. A non-limiting commercial example of suitable montmorillonite clay may include Aluminum Pillared Clay by Sigma Aldrich (St. Louis, Mo.). The clay may be comprised of M-I Gel Wyoming clay (Wyoming bentonite sodium montmorillonite clay), commercially available from Schlumberger Company (Houston, Tex.). In some embodiments, the clay may comprise a nanoclay. As used throughout the disclosure, "nanoclay" refers to a clay comprising nanoparticles of layered mineral silicates, and "nanoparticles" refers to particles having an average particle size of 0.1 to 1000 nanometers (nm). In one or more embodiments, the nanoparticles may have an average particle size of 1 to 100 nm, or 1 to 80 nm, or 5 to 75 nm, or 10 to 60 nm. A non-limiting commercial example of a suitable nanoclay may include cloisite $Na^+$ by BYK Additives and Instruments (Wesel, Germany).

In some embodiments, the viscosifier may comprise metallic oxide nanoparticles. Various metal oxide nanoparticles are contemplated. In one or more embodiments, the metal oxides may comprise one or more transition metal oxides, for example, oxides of transition metals or post-transition metals. For example and not by way of limitation, these transition metal oxides may include one or more of zirconium oxide and titanium oxide. In another embodiment, the metal oxides may comprise rare earth oxides, such as cerium oxide. In a specific embodiment, the metal oxide nanoparticles are zirconium oxide ($ZrO_2$) nanoparticles. The metal oxide nanoparticles may be added to the fracturing fluid in various forms, such as in powder form or in a dispersion, for example, an aqueous dispersion. A commercially suitable example includes 20 nm high purity 99.95% $ZrO_2$ particles available from U.S. Research Nanomaterials Inc. (Houston, Tex.).

The viscosifier in some embodiments may comprise graphite, and, in specific embodiments, graphite powder. The viscosifier may comprise carbon nanotubes (CNT). A non-limiting commercial example of a suitable carbon nanotube may include CNT multi-walled carbon nanotubes from Cheap Tubes Inc. (Brattleboro, Vt.). The carbon nanotubes may, in some embodiments, have a 30 to 50 nm outer diameter (OD) and may have a purity of 95 weight percent (wt %) or more. In this disclosure, except where clearly identified otherwise, weight percents are based on the total weight of the composition and are referenced as "weight percent" or "% by weight."

Embodiments of the disclosure additionally relate to methods of making the gelled hydrocarbon fracturing fluid. The method may include combining a hydrocarbon fluid, a phosphate ester and a crosslinker, all of which may be according to any of the embodiments previously discussed. The hydrocarbon fluid, phosphate ester, and crosslinker may form a baseline fluid. A viscosifier may be added to the baseline fluid to form a gelled hydrocarbon fracturing fluid. Similarly, the viscosifier may be in accordance with any of the embodiments previously described. The viscosifier may be added to any of the hydrocarbon fluid, phosphate ester, crosslinker or combinations thereof, in any order, including but not limited to, adding the components simultaneously, consecutively, sequentially, or by adding the viscosifier to the already-formed baseline fluid. In some embodiments, the viscosifier may be added to the baseline fluid to evenly disperse the viscosifier in the baseline fluid. In other embodiments, the viscosifier, hydrocarbon fluid, phosphate ester, and crosslinker may be combined simultaneously or consecutively to form the gelled hydrocarbon fracturing fluid to reduce the complexity and therefore the cost of the combining step.

As previously described, the viscous nature of the gelled hydrocarbon fracturing fluid may aid in generating and propagating fractures in subterranean formations. In hydraulic fracturing, also known as "fracking," subterranean formations are contacted with hydraulic fracturing fluids to generate a fracture (also known as a "fissure") in the rock. As previously described, if the hydraulic fluid is not sufficiently viscous, (such as, for instance, a fluid having a low viscosity of less than 20 centipoises (cP) at 250° Fahrenheit (F) and a shear rate of 100 seconds$^{-1}$ ($s^{-1}$)), the proppants may not suspend in the fluid, but rather may sink to the bottom, which could clog the refinery equipment used with the hydraulic fluid or cause the fracture to prematurely close.

Therefore, in some embodiments, the gelled hydrocarbon fracturing fluid may have a viscosity of at least 50 cP at 250° F. and a shear rate of 100 $s^{-1}$, as measured using rotational rheometry with a Fann 50-type viscometer, such as Grace M5600 high pressure high temperature (HPHT) rheometer. In one or more embodiments, the gelled hydrocarbon fracturing fluid may have a viscosity of at least 20 cP, at least 50 cP, at least 80 cP, at least 100 cP, at least 120 cP, at least 135 cP, or at least 150 cP at 250° F. and a shear rate of 100 $s^{-1}$. In some embodiments, the gelled hydrocarbon fracturing fluid may have a viscosity of at least 175 cP, or at least 200 cP or at least 220 cP, or at least 250 cP at 250° F. and a shear rate of 100 $s^{-1}$, as measured using rotational rheometry. Similarly, the gelled hydrocarbon fracturing fluid may have a viscosity of at least 20 cP, at least 50 cP, at least 80 cP, at least 100 cP, at least 120 cP, at least 135 cP, or at least 150 cP at 200° F. and a shear rate of 100 $s^{-1}$. In some embodiments, the gelled hydrocarbon fracturing fluid may have a viscosity of at least 175 cP, or at least 200 cP or at least 220 cP, or at least 250 cP at 200° F. and a shear rate of 100 $s^{-1}$, as measured using rotational rheometry.

Embodiments of the present disclosure also include method of treating a subterranean formation comprising contacting a subterranean formation with a gelled hydrocarbon fracturing fluid and generating at least one fracture in the subterranean fluid. The method may involve any embodiments of the gelled hydrocarbon fracturing fluid previously described. In some embodiments, the subterranean formation may comprise a rock formation. In some embodiments, the subterranean formation may comprise shale.

While embodiments of the gelled hydrocarbon fracturing fluid may be used in hydraulic fracturing processes, the gelled hydrocarbon fluid may also be used in other industries. For instance, the gelled hydrocarbon fracturing fluid may, in some embodiments, be used to stimulate groundwater wells, to precondition or induce rock cave-ins for mining operations, to dispose of waste by injecting it deeply into rock, to measure stresses in the Earth's crust, for electricity generation in enhanced geothermal systems, and to increase injection rates for the geologic sequestration of $CO_2$.

EXAMPLES

To demonstrate the effects of the combination of hydrocarbon fluid, phosphate ester, viscosifier, and crosslinker in accordance with the present embodiments, seven examples were conducted in which varying compositions of hydraulic fracture fluids were tested against the gelled hydrocarbon fracturing fluids of the present embodiments.

Example 1—Montmorillonite Clay

Example 1 studied the three hydraulic fracturing fluids with varying compositions in which clay was used as the viscosifier. Sample 1 containing diesel oil, phosphate ester, a montmorillonite clay viscosifier, and a crosslinker, was compared to two comparative samples. Comparative Sample 1 lacked the clay viscosifier, whereas Comparative Sample 2 lacked phosphate ester and crosslinker. The compositions of all three samples are set forth in Table 1.

TABLE 1

Composition of Sample 1 and Comparative Samples 1 and 2

| Sample | Base fluid | Phosphate Ester | Viscosifier | Crosslinker |
|---|---|---|---|---|
| Sample 1 | 50 mL diesel oil | 0.4 mL (8 gpt) EG-2 | 0.187 g (30 ppt) Montmorillonite clay | 0.4 mL (8 gpt) EA-3 |
| Comparative Sample 1 | 50 mL diesel oil | 0.4 mL (8 gpt) EG-2 | — | 0.4 mL (8 gpt) EA-3 |
| Comparative Sample 2 | 50 mL diesel oil | — | 0.187 g (30 ppt) Montmorillonite clay | — |

To prepare Comparative Sample 1, 0.4 mL (8 gpt) EG-2 phosphate ester from Ethox Chemicals and 0.4 mL (8 gpt) Ethox EA-3 iron-based crosslinker from Ethox Chemicals were added to 50 mL diesel oil to form a baseline fluid. To prepare Comparative Sample 2, 0.187 g (30 ppt) of montmorillonite (MMT Aluminum Pillared Clay from Sigma Aldrich) was added to 50 mL diesel oil without the addition of a phosphate ester or a crosslinker. The viscosity of the fluids was measured from room temperature to 250° F. at a shear rate of 100 $s^{-1}$ with a Fann50-type viscometer.

Figure 1:
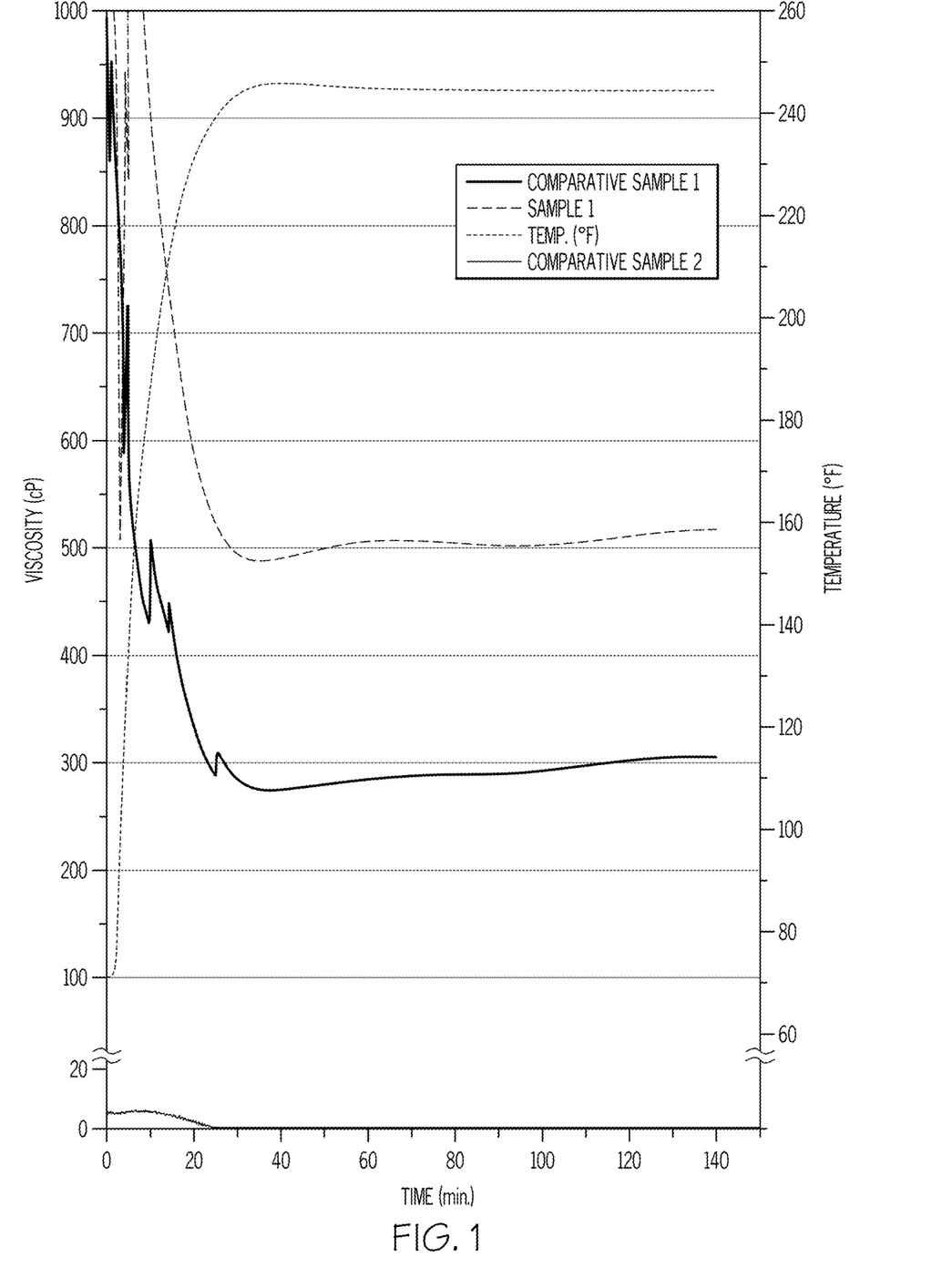
FIG. 1 is a graph of the viscosity of a gelled hydrocarbon fracturing fluid according to the embodiments described and two comparative hydrocarbon fracturing fluids.

To measure the viscosity of a gelled oil fracturing fluid sample under the conditions designed to simulate those in a high temperature and high pressure subterranean reservoir formation, 52 mL of the gelled oil sample was placed into a Fann50-type viscometer such as Grace M5600 HPHT rheometer. Tests were performed at the bottomhole temperature, following the API RP 39 schedule and under about 400 psi of nitrogen. The bottomhole temperature (BHT) refers to the temperature in the borehole at total depth at the time it is measured, which, in log interpretation, is taken as the maximum recorded temperature during a logging run or during the last series of runs during the same operation. The API RP 39 schedule consisted of continuous fluid shearing at 100/s shear rate and a series of shearing ramps at 100, 75, 50, 25, 50, 75, and 100/s once the fluid temperature was within 5° F. of the bottomhole temperature and occurring periodically for every 30 minutes. To prepare Sample 1, 0.187 g (30 ppt) of the montmorillonite was mixed into the baseline fluid. The viscosity was similarly measured from room temperature to 250° F. and a shear rate of 100 $s^{-1}$. FIG. 1 depicts the viscosity of Sample 1 as compared to Comparative Samples 1 and 2 from 0 to 140 minutes, at a temperature of from 75° F. (room temperature) to 250° F. and a shear rate of 100 $s^{-1}$.

Sample 1 showed an averaged viscosity between 20 min and 140 min enhanced 73% over Comparative Sample 1, which did not contain the viscosifier, montmorillonite. However, Comparative Sample 2 demonstrates that the addition of the montmorillonite was not solely responsible for the improvement, as the viscosity levels for Comparative Sample 2 (which contained 30 ppt montmorillonite) were less than 10 cP and even less than 5 cP. Rather, the synergistic combination of the hydrocarbon fluid, the phosphate ester, the crosslinker and the montmorillonite viscosifier produces a 3D gel network that is responsible for the viscosity enhancement of approximately 200 cP at 250° F. at lower phosphate ester levels.

Example 2—M-I Wyoming Clay

Example 2 studied the three hydraulic fracturing fluids with varying compositions in which a different clay, M-I Wyoming clay, was used as the viscosifier. Sample 2 containing diesel oil, phosphate ester, M-I Wyoming clay as the viscosifier, and a crosslinker. Comparative Sample 3 lacked the clay viscosifier, whereas Comparative Sample 4 lacked phosphate ester and crosslinker. The compositions of all three samples are set forth in Table 2.

TABLE 2

Composition of Sample 2 and Comparative Samples 3 and 4

| Sample | Base fluid | Phosphate Ester | Viscosifier | Crosslinker |
| --- | --- | --- | --- | --- |
| Sample 2 | 50 mL diesel oil | 0.4 mL (8 gpt) EG-2 | 0.187 g (30 ppt) M-I Wyoming clay | 0.4 mL (8 gpt) EA-3 |
| Comparative Sample 3 | 50 mL diesel oil | 0.4 mL (8 gpt) EG-2 | — | 0.4 mL (8 gpt) EA-3 |
| Comparative Sample 4 | 50 mL diesel oil | — | 0.187 g (30 ppt) M-I Wyoming clay | — |

Figure 2:
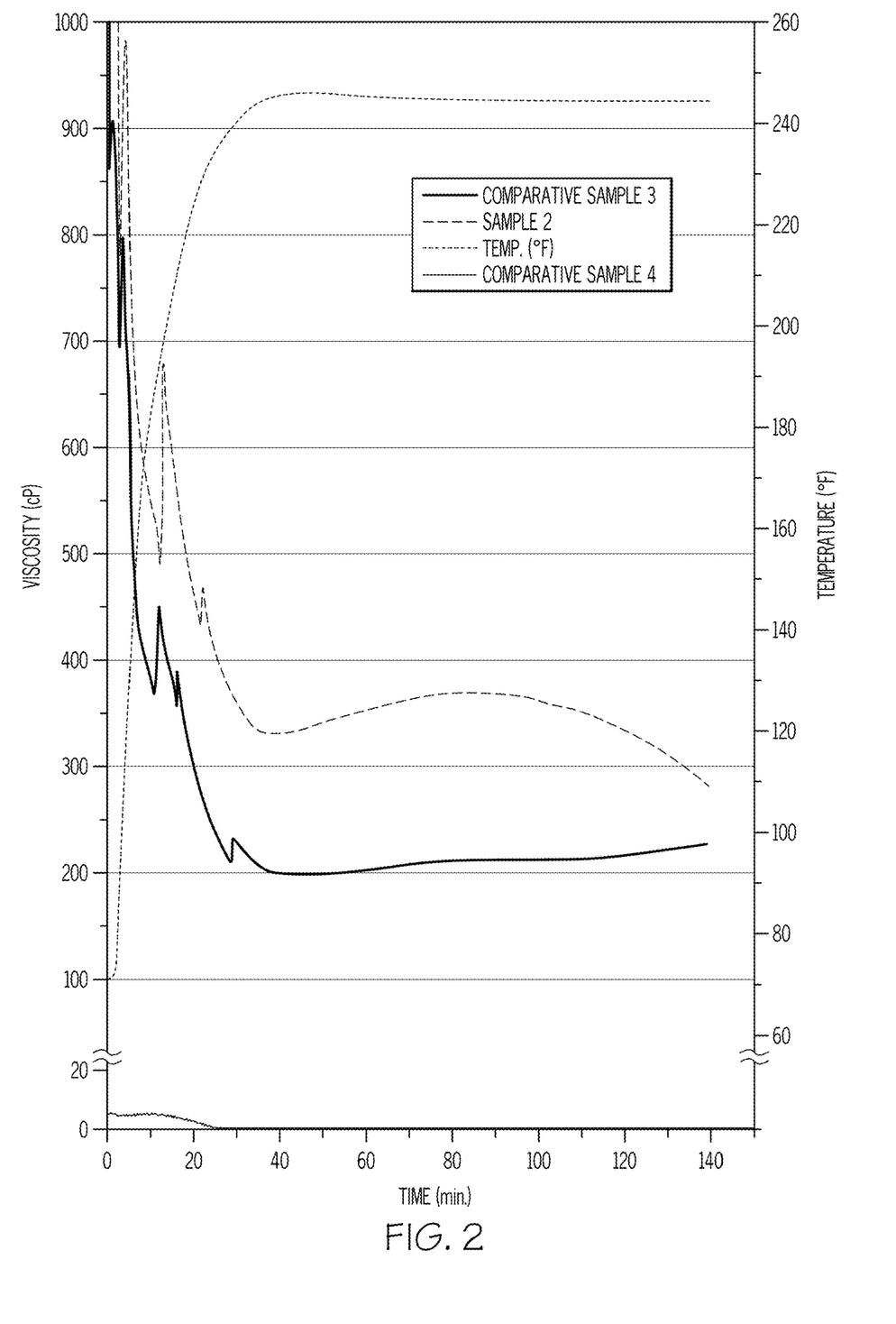
FIG. 2 is a graph of the viscosity of a gelled hydrocarbon fracturing fluid according to the embodiments described and two comparative hydrocarbon fracturing fluids.

To prepare Comparative Sample 3, 0.4 mL (8 gpt) Ethox EG-2 phosphate ester and 0.4 mL (8 gpt) Ethox EA-3 iron-based crosslinker were added to 50 mL diesel oil to form a baseline fluid. To prepare Comparative Sample 4, 0.187 g (30 ppt) of M-I Wyoming clay was added to 50 mL diesel oil without the addition of a phosphate ester or a crosslinker. The viscosity of the fluids was measured from room temperature to 250° F. at a shear rate of 100 s$^{-1}$ with a Fann50-type viscometer. To prepare Sample 2, 0.187 g (30 ppt) of M-I Wyoming clay was mixed into the baseline fluid. The viscosity was similarly measured from room temperature to 250° F. FIG. 2 depicts the viscosity of Sample 2 as compared to Comparative Samples 3 and 4 from 0 to 140 minutes, at a temperature of from 75° F. to 250° F. and a shear rate of 100 s$^{-1}$.

In comparing Comparative Sample 3 and Sample 2, the averaged viscosity between 20 min and 140 min was enhanced 42% with the addition of 30 ppt M-I Wyoming clay. However, Comparative Sample 4 demonstrates that the 30 ppt M-I Wyoming clay is not solely responsible for the increased viscosity. The viscosity of Comparative Sample 4 was consistently less than 10 cP and even less than 5 cP, while the viscosity of Sample 2 was over 200 cP at 250° F. Rather, the synergistic combination of the hydrocarbon fluid, the phosphate ester, the crosslinker and the Wyoming clay viscosifier produces a 3D gel network that is responsible for the viscosity enhancement at lower phosphate ester levels.

Example 3—Graphite Powder

Example 3 studied the four hydraulic fracturing fluids with varying compositions in which graphite powder was used as the viscosifier. Sample 3 contained diesel oil, phosphate ester, 30 parts per thousand (ppt) graphite powder as the viscosifier, and a crosslinker. Sample 4 also contained diesel oil, phosphate ester and a crosslinker, but contained 20 ppt of graphite powder as the viscosifier. Comparative Sample 5 lacked the viscosifier, and Comparative Sample 6 lacked phosphate ester, and crosslinker. The compositions of all four samples are set forth in Table 3.

TABLE 3

Composition of Samples 3 and 4 and Comparative Samples 5 and 6

| Sample | Base fluid | Phosphate Ester | Viscosifier | Crosslinker |
| --- | --- | --- | --- | --- |
| Sample 3 | 50 mL diesel oil | 0.4 mL (8 gpt) EG-2 | 0.187 g (30 ppt) graphite powder | 0.4 mL (8 gpt) EA-3 |
| Sample 4 | 50 mL diesel oil | 0.4 mL (8 gpt) EG-2 | 0.125 g (20 ppt) graphite powder | 0.4 mL (8 gpt) EA-3 |
| Comparative Sample 5 | 50 mL diesel oil | 0.4 mL (8 gpt) EG-2 | — | 0.4 mL (8 gpt) EA-3 |
| Comparative Sample 6 | 50 mL diesel oil | — | 0.187 g (30 ppt) graphite powder | — |

Figure 3:
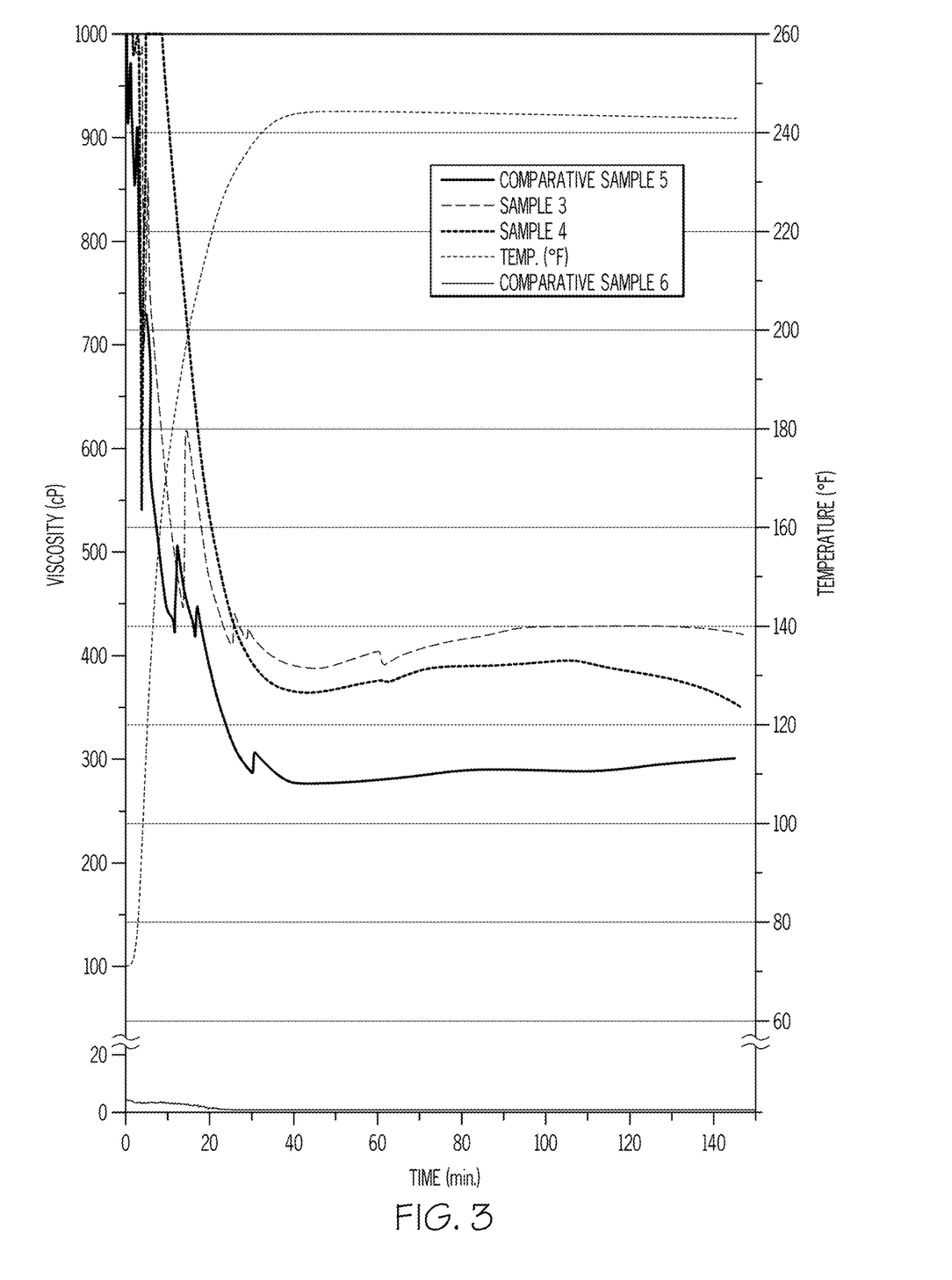
FIG. 3 is a graph of the viscosity of two gelled hydrocarbon fracturing fluids according to the embodiments described and two comparative hydrocarbon fracturing fluids.

To prepare Comparative Sample 5, 0.4 mL (8 gpt) Ethox EG-2 phosphate ester and 0.4 mL (8 gpt) Ethox EA-3 iron-based crosslinker were added to 50 mL diesel oil to form a baseline fluid. To prepare Comparative Sample 6, 0.187 g (30 ppt) of the same graphite powder was added to 50 mL diesel oil without the addition of a phosphate ester or a crosslinker. The viscosity of the fluids was measured from room temperature to 250° F. at a shear rate of 100 s$^{-1}$ with a Fann50-type viscometer. To prepare Sample 3, 0.187 g (30 ppt) of graphite powder was mixed into the baseline fluid. To prepare Sample 4, 0.125 g (20 ppt) of graphite powder was mixed into the baseline fluid. The viscosity of the fluids was similarly measured from room temperature to 250° F. FIG. 3 depicts the viscosity of Sample 3 and Sample 4 as compared to Comparative Samples 5 and 6 from 0 to 140 minutes, at a temperature of from 75° F. to 250° F. and a shear rate of 100 s$^{-1}$.

In comparing Comparative Sample 5 and Samples 3 and 4, the averaged viscosity between 20 min and 120 min enhanced 44% with the addition of 30 ppt graphite powder (Sample 3) and 33% with the 20 ppt graphite powder (Sample 4). Comparative Sample 6 shows that the graphite powder was not the determinative factor, as the viscosity was consistently less than 10 cP and even less than 5 cP, versus Sample 3, which showed a viscosity of about 400 cP at 250° F. Similar to the other examples, the synergistic combination of the hydrocarbon fluid, the phosphate ester, the crosslinker and the graphite powder viscosifier produces a 3D gel network that is responsible for the viscosity enhancement at lower phosphate ester levels.

Example 4—Carbon Nanotubes

Example 4 studied the four hydraulic fracturing fluids with varying compositions in which carbon nanotubes were used as the viscosifier. Sample 5 contained diesel oil, phosphate ester, 30 ppt carbon nanotubes as the viscosifier, and a crosslinker. Sample 6 also contained diesel oil, phosphate ester and a crosslinker, but contained 20 ppt of carbon nanotubes as the viscosifier. Comparative Sample 7 lacked the viscosifier, and Comparative Sample 8 lacked phosphate ester, viscosifier, and crosslinker. The compositions of all four samples are set forth in Table 4.

TABLE 4

Composition of Samples 5 and 6 and Comparative Samples 7 and 8

| Sample | Base fluid | Phosphate Ester | Viscosifier | Crosslinker |
|---|---|---|---|---|
| Sample 5 | 50 mL diesel oil | 0.4 mL (8 gpt) EG-2 | 0.187 g (30 ppt) carbon nanotubes | 0.4 mL (8 gpt) EA-3 |
| Sample 6 | 50 mL diesel oil | 0.4 mL (8 gpt) EG-2 | 0.125 g (20 ppt) carbon nanotubes | 0.4 mL (8 gpt) EA-3 |
| Comparative Sample 7 | 50 mL diesel oil | 0.4 mL (8 gpt) EG-2 | — | 0.4 mL (8 gpt) EA-3 |
| Comparative Sample 8 | 50 mL diesel oil | — | 0.125 g (20 ppt) carbon nanotubes | — |

Figure 4:
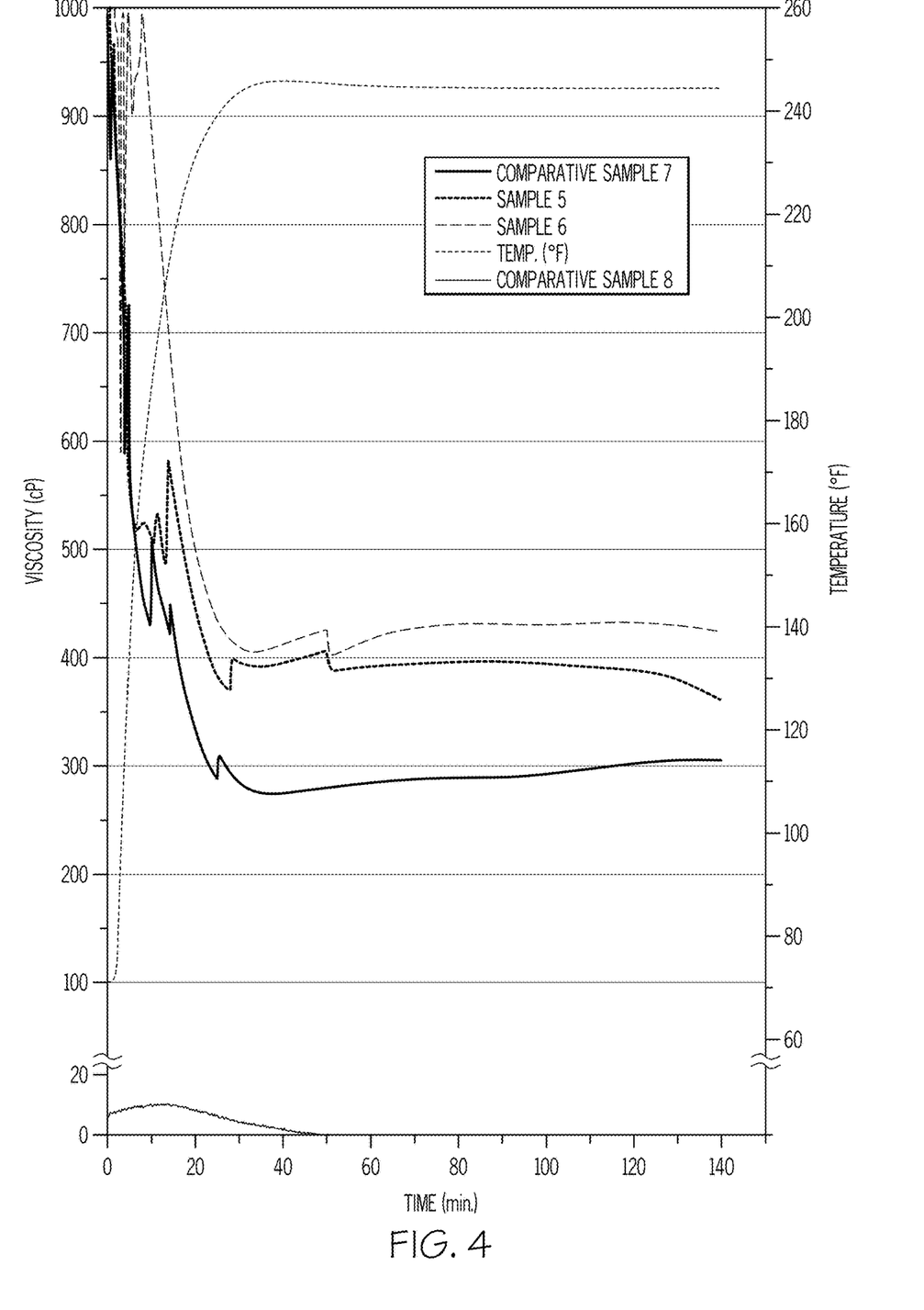
FIG. 4 is a graph of the viscosity of two gelled hydrocarbon fracturing fluids according to the embodiments described and two comparative hydrocarbon fracturing fluids.

To prepare Comparative Sample 7, 0.4 mL (8 gpt) Ethox EG-2 phosphate ester and 0.4 mL (8 gpt) Ethox EA-3 iron-based crosslinker were added to 50 mL diesel oil to form a baseline fluid. To prepare Comparative Sample 8, 0.125 g (20 ppt) of the carbon nanotubes was added to 50 mL diesel oil without the addition of a phosphate ester or a crosslinker. The viscosity of the fluids was measured from room temperature to 250° F. at a shear rate of 100 s$^{-1}$ with a Fann50-type viscometer. To prepare Sample 5, 0.187 g (30 ppt) of carbon nanotubes was mixed into the baseline fluid. To prepare Sample 6, 0.125 g (20 ppt) of carbon nanotubes was mixed into the baseline fluid. The viscosity of the fluids were similarly measured from room temperature to 250° F. FIG. 4 depicts the viscosity of Sample 5 and Sample 6 as compared to Comparative Samples 7 and 8 from 0 to 140 minutes, at a temperature of from 75° F. to 250° F. and a shear rate of 100 s$^{-1}$.

Notably, for Samples 5 and 6, the averaged viscosity between 20 min and 140 min increased 35% with the addition of 30 ppt carbon nanotubes and 46% with the 20 ppt carbon nanotubes, respectively, when compared to Comparative Sample 7. Likewise, the viscosity enhancement of Sample 6 was about 400 cP at 250° F., compared to Comparative Sample 8, which had a viscosity of less than 10 cP and even less than 7 cP at 250° F. Without wishing to be bound by theory, Sample 6 (20 ppt carbon nanotubes) may be closer to an optimum dosage, or an amount that will produce the most-desired effect with the least amount of resources. Sample 6 produced a more viscous gelled hydrocarbon fluid while utilizing fewer carbon nanotubes than Sample 5 (increase of 35% with 30 ppt carbon nanotubes verses increase of 46% with 20 ppt carbon nanotubes).

Example 5—Cloisite Na$^+$ Nanoclay

Example 5 studied the four hydraulic fracturing fluids with varying compositions in which cloisite Na$^+$ nanoclay was used as the viscosifier. Sample 7 contained diesel oil, phosphate ester, 30 ppt cloisite Na$^+$ nanoclay powder as the viscosifier, and a crosslinker. Sample 8 also contained diesel oil, phosphate ester and a crosslinker, but contained 20 ppt of cloisite Na$^+$ nanoclay as the viscosifier. Comparative Sample 9 lacked the viscosifier, and Comparative Sample 10 lacked phosphate ester, and crosslinker. The compositions of all four samples are set forth in Table 5.

TABLE 5

Composition of Samples 7 and 8 and Comparative Samples 9 and 10

| Sample | Base fluid | Phosphate Ester | Viscosifier | Crosslinker |
|---|---|---|---|---|
| Sample 7 | 50 mL diesel oil | 0.4 mL (8 gpt) EG-2 | 0.187 g (30 ppt) Cloisite Na$^+$ Nanoclay | 0.4 mL (8 gpt) EA-3 |
| Sample 8 | 50 mL diesel oil | 0.4 mL (8 gpt) EG-2 | 0.125 g (20 ppt) Cloisite Na$^+$ Nanoclay | 0.4 mL (8 gpt) EA-3 |
| Comparative Sample 9 | 50 mL diesel oil | 0.4 mL (8 gpt) EG-2 | — | 0.4 mL (8 gpt) EA-3 |
| Comparative Sample 10 | 50 mL diesel oil | — | 0.187 g (30 ppt) Cloisite Na$^+$ Nanoclay | — |

Figure 5:
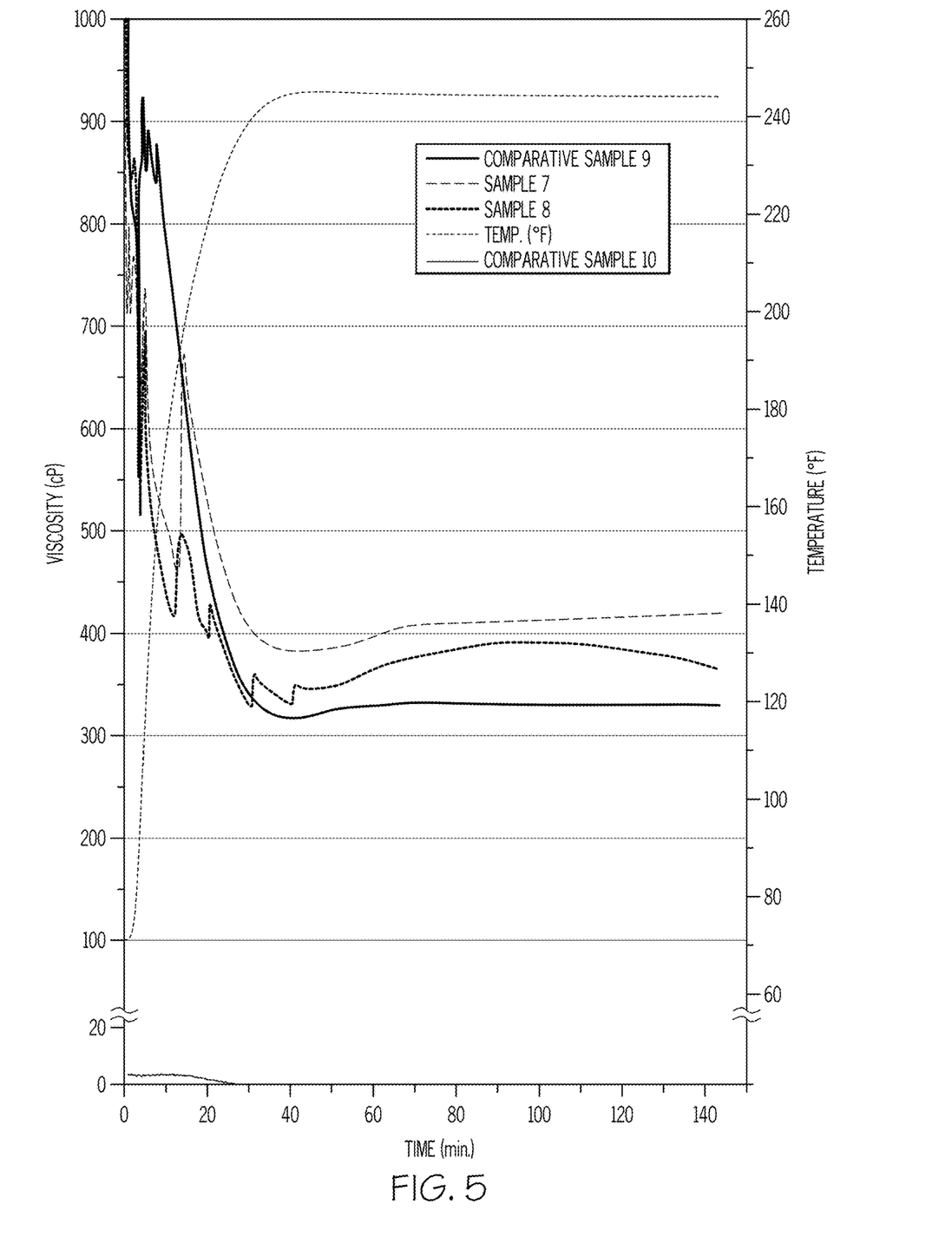
FIG. 5 is a graph of the viscosity of two gelled hydrocarbon fracturing fluids according to the embodiments described and two comparative hydrocarbon fracturing fluids.

To prepare Comparative Sample 9, 0.4 mL (8 gpt) Ethox EG-2 phosphate ester and 0.4 mL (8 gpt) Ethox EA-3 iron-based crosslinker were added to 50 mL diesel oil to form a baseline fluid. To prepare Comparative Sample 10, 0.187 g (30 ppt) of cloisite Na$^+$ was added to 50 mL diesel oil without the addition of a phosphate ester or a crosslinker. The viscosity of the fluids was measured from room temperature to 250° F. at a shear rate of 100 s$^{-1}$ with a Fann50-type viscometer. To prepare Sample 7, 0.187 g (30 ppt) of powdered cloisite Na$^+$ was mixed into baseline fluid. The viscosity was similarly measured from room temperature to 250° F. To prepare Sample 8, 0.125 g (20 ppt) of powdered cloisite Na$^+$ was mixed into baseline fluid. FIG. 5 depicts the viscosity of Sample 7 and Sample 8 as compared to Comparative Samples 9 and 10 from 0 to 140 minutes, at a temperature of from 75° F. to 250° F. and a shear rate of 100 s$^{-1}$.

When comparing Comparative Sample 9 with Samples 7 and 8, the averaged viscosity between 20 min and 140 min enhanced 25% with the addition of 30 ppt cloisite Na$^+$ (Sample 7) and 13% with the addition of 20 ppt cloisite Na$^+$ (Sample 8). However, the addition of cloisite Na$^+$ is not solely responsible for the improved results, as Comparative Sample 10 had an average viscosity of less than 10 cP. At 250° F., Sample 7 had an average viscosity of about 400 cP whereas Comparative Sample 10 only had an average viscosity of less than 5 cP.

Example 6—ZrO$_2$ Nanoparticles

Example 6 studied the three hydraulic fracturing fluids with varying compositions in which ZrO$_2$ nanoparticles were used as the viscosifier. Sample 9 contained diesel oil, phosphate ester, 30 ppt ZrO$_2$ nanoparticles as the viscosifier, and a crosslinker. Comparative Sample 11 lacked the viscosifier, and Comparative Sample 10 lacked phosphate ester and crosslinker. The compositions of all three samples are set forth in Table 6.

TABLE 6

Composition of Sample 9 and Comparative Samples 11 and 12

| Sample | Base fluid | Phosphate Ester | Viscosifier | Crosslinker |
|---|---|---|---|---|
| Sample 9 | 50 mL diesel oil | 0.4 mL (8 gpt) EG-2 | 0.187 g (30 ppt) ZrO$_2$ nanoparticles | 0.4 mL (8 gpt) EA-3 |

TABLE 6-continued

Composition of Sample 9 and Comparative Samples 11 and 12

| Sample | Base fluid | Phosphate Ester | Viscosifier | Crosslinker |
|---|---|---|---|---|
| Comparative Sample 11 | 50 mL diesel oil | 0.4 mL (8 gpt) EG-2 | — | 0.4 mL (8 gpt) EA-3 |
| Comparative Sample 12 | 50 mL diesel oil | — | 0.187 g (30 ppt) ZrO$_2$ nanoparticles | — |

Figure 6:
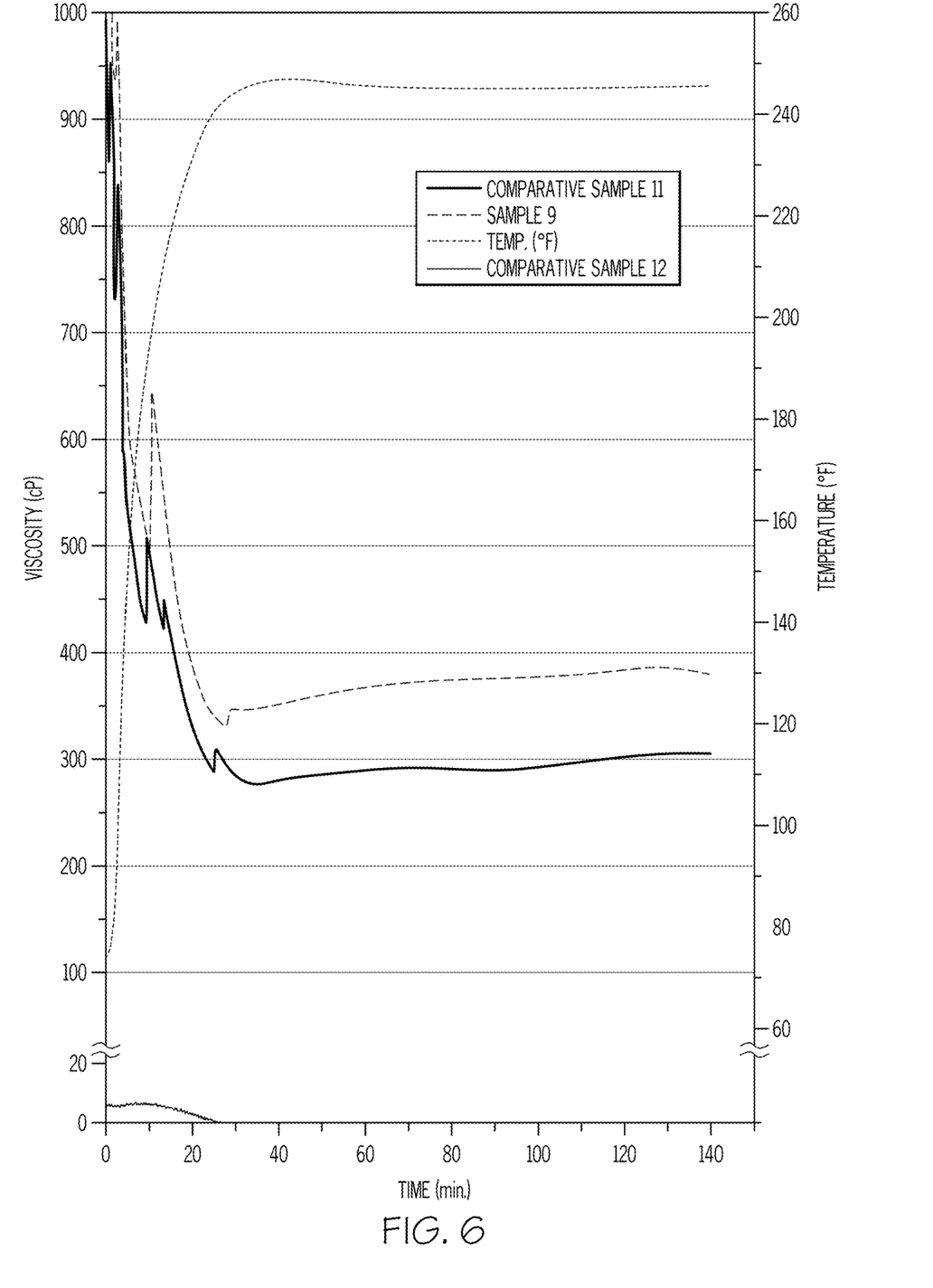
FIG. 6 is a graph of the viscosity of a gelled hydrocarbon fracturing fluid according to the embodiments described and two comparative hydrocarbon fracturing fluids.

To prepare Comparative Sample 11, 0.4 mL (8 gpt) Ethox EG-2 phosphate ester and 0.4 mL (8 gpt) Ethox EA-3 iron-based crosslinker were added to 50 mL diesel oil to form a baseline fluid. To prepare Comparative Sample 12, 0.187 g (30 ppt) of the ZrO$_2$ nanoparticles was added to 50 mL diesel oil without the addition of a phosphate ester or a crosslinker. The viscosity of the fluids was measured from room temperature to 250° F. at a shear rate of 100 s$^{-1}$ with a Fann50-type viscometer. To prepare Sample 9, 0.187 g (30 ppt) of ZrO$_2$ nanoparticles (99.95% purity, 20 nm) was mixed into baseline fluid. The viscosity was similarly measured from room temperature to 250° F. FIG. 6 depicts the viscosity of Sample 9 as compared to Comparative Samples 11 and 12 from 0 to 140 minutes, at a temperature of from 75° F. to 250° F. and a shear rate of 100 s$^{-1}$.

When comparing Sample 9 and Comparative Sample 11, the averaged viscosity between 20 min and 140 min enhanced 25% with the addition of 30 ppt ZrO$_2$ nanoparticles. However, the addition of ZrO$_2$ is not solely responsible for the improved results, as Comparative Sample 12 had an average viscosity of less than 10 cP. At 250° F., Sample 9 had an average viscosity of over 300 cP whereas Comparative Sample 12 only had an average viscosity of less than 5 cP.

Example 7—Montmorillonite

Example 7 studied the three hydraulic fracturing fluids with varying amounts of phosphate ester and crosslinker. Sample 10 contained diesel oil, 6 gpt phosphate ester, 30 ppt montmorillonite clay as the viscosifier, and 6 gpt crosslinker. Comparative Sample 14 lacked the viscosifier but had 8 gpt of phosphate ester and 8 gpt of crosslinker, and Comparative Sample 13 lacked the viscosifier but had 6 gpt of phosphate ester and 6 gpt of crosslinker. The compositions of all three samples are set forth in Table 7.

TABLE 7

Composition of Sample 10 and Comparative Samples 13 and 14

| Sample | Base fluid | Phosphate Ester | Viscosifier | Crosslinker |
|---|---|---|---|---|
| Sample 10 | 50 mL diesel oil | 0.3 mL (6 gpt) EG-2 | 0.187 g (30 ppt) montmorillonite clay | 0.3 mL (6 gpt) EA-3 |
| Comparative Sample 13 | 50 mL diesel oil | 0.3 mL (6 gpt) EG-2 | — | 0.3 mL (6 gpt) EA-3 |
| Comparative Sample 14 | 50 mL diesel oil | 0.4 mL (8 gpt) EG-2 | — | 0.4 mL (8 gpt) EA-3 |

Figure 7:
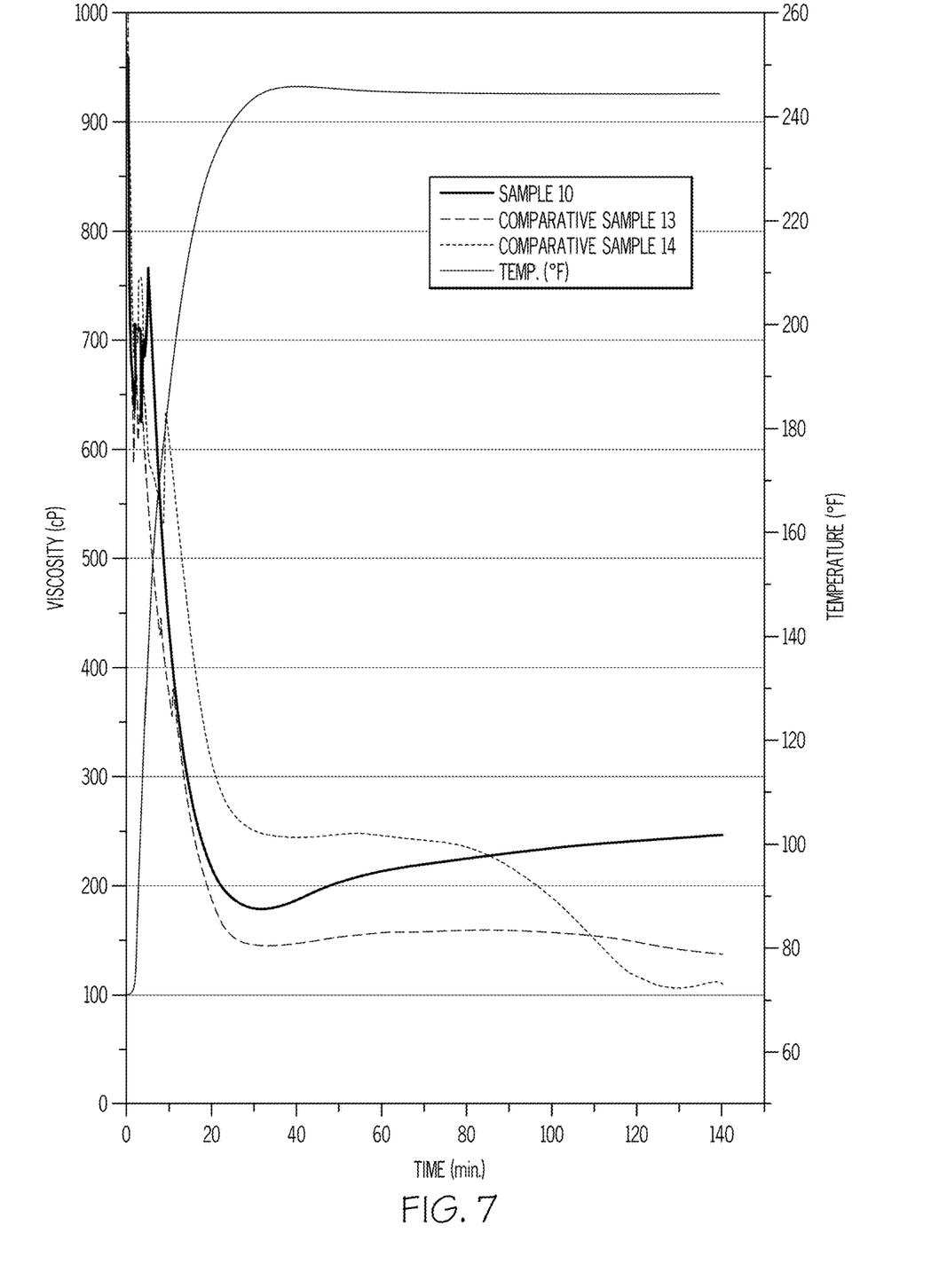
FIG. 7 is a graph of the viscosity of a gelled hydrocarbon fracturing fluid according to the embodiments described and two comparative hydrocarbon fracturing fluids.

To prepare Comparative Sample 13, 0.3 mL (6 gpt) Ethox EG-2 phosphate ester and 0.3 mL (6 gpt) Ethox EA-3 iron-based crosslinker were added to 50 mL diesel oil to form a baseline fluid. To prepare Comparative Sample 14, 0.4 mL (8 gpt) Ethox EG-2 phosphate ester and 0.4 mL (8 gpt) Ethox EA-3 iron-based crosslinker were added to 50 mL diesel oil to form a second baseline fluid. The viscosity of the fluids was measured from room temperature (75° F.) to 250° F. at a shear rate of 100 s$^{-1}$ with a Fann50-type viscometer. To prepare Sample 10, 0.187 g (30 ppt) of montmorillonite clay was mixed into the second 6 gpt baseline fluid (prepared using 6 gpt EG-2 and 6 gpt EA-3). The viscosity was similarly measured from room temperature to 250° F. FIG. 7 depicts the viscosity of Sample 10 as compared to Comparative Sample 13 and Comparative Sample 14 from 0 to 140 minutes, at a temperature of from 75° F. to 250° F. and a shear rate of 100 s$^{-1}$.

The comparison between the 6 gpt and the 8 gpt baseline fluids of Comparative Samples 13 and 14, respectively, depicts the reduction of phosphate ester that can be achieved without adding additional components. As shown in FIG. 7, the amount of phosphate ester can be reduced by 25% (as the amount of phosphate ester was reduced from 8 gpt to 6 gpt) and by adding 30 ppt montmorillonite, there was little reduction in viscosity as the viscosity curves of Sample 10 and Comparative Sample 14 were overlapped.

Example 8—Crude Oil

Example 8 studied hydraulic fracturing fluids prepared using crude oil. Sample 11 contained crude oil, phosphate ester, crosslinker, and montmorillonite clay viscosifier. Comparative Sample 15 contained crude oil, phosphate ester and crosslinker but did not contain a viscosifier. The compositions are set forth in Table 8.

TABLE 8

Composition of Sample 11 and Comparative Sample 15

| Sample | Base fluid | Phosphate Ester | Viscosifier | Crosslinker |
|---|---|---|---|---|
| Sample 11 | 50 mL crude oil | 0.4 mL (8 gpt) EG-2 | 0.187 g (30 ppt) Montmorillonite clay | 0.4 mL (8 gpt) EA-3 |
| Comparative Sample 15 | 50 mL crude oil | 0.4 mL (8 gpt) EG-2 | — | 0.4 mL (8 gpt) EA-3 |

To prepare Sample 11, 50 mL of crude oil was combined with 8 gpt EG-2 phosphate ester and 8 gpt EA-3 crosslinker, and 30 ppt of montmorillonite clay (Aluminum Pillared Clay, by Sigma Aldrich). The crude oil was a Saudi Arabian crude oil sample with a total sulfur level of more than 0.5% (2.24% as measured), considered to be "sour". The crude was a light crude oil with an API gravity higher than 31.1° (32.83° as measured). Similarly, to prepare Comparative Sample 15, the same crude oil was combined with crude oil was combined with 8 gpt EG-2 phosphate ester and 8 gpt EA-3 crosslinker, without any additives.

Figure 8:
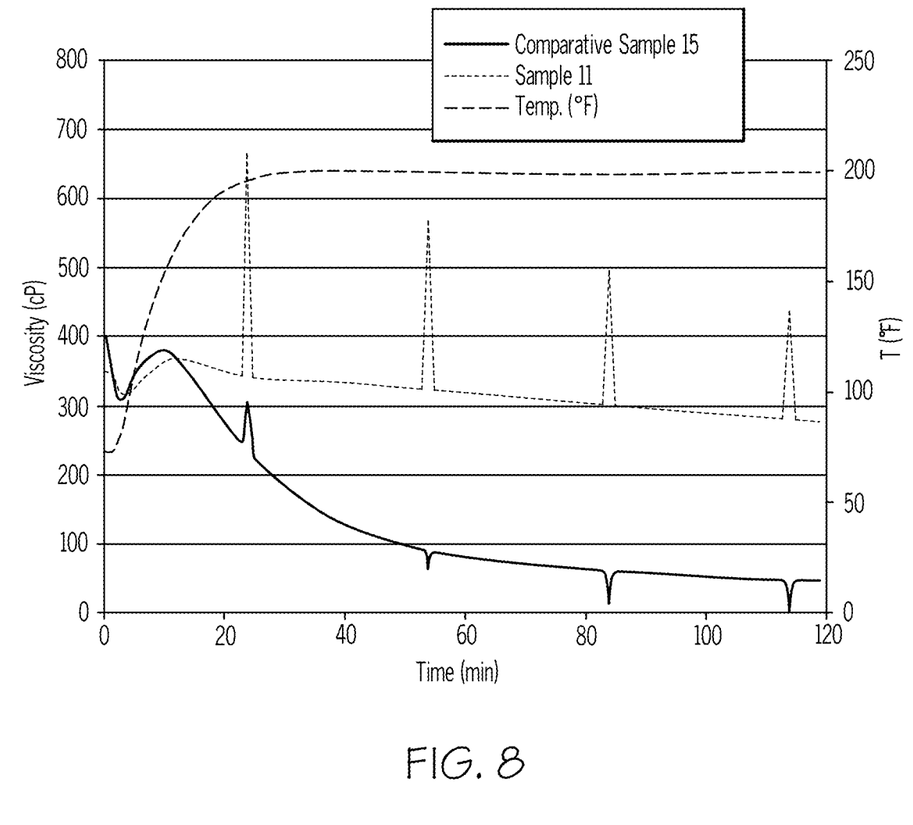
FIG. 8 is a graph of the viscosity of a gelled hydrocarbon fracturing fluid according to the embodiments described and one comparative hydrocarbon fracturing fluid.

The fluid viscosity at 200° F. for both samples was measured with the Grace M5600 HPHT rheometer, the results of which are set forth in FIG. 8. Compared with Comparative Example 15, Sample 11 displayed improved long-term stability at 200° F. Near the end of the tests, at about 120 min, the viscosity (at 100/s shear rate) of Sample 11 was about 6 times that of Comparative Sample 15.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

It will be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

What is claimed is:

1. A gelled hydrocarbon fracturing fluid comprising
    a hydrocarbon fluid;
    from 1 gpt to 100 gpt of a phosphate ester;
    from 1 gpt to 100 gpt of a crosslinker comprising a component selected from the group consisting of iron, aluminum, and combinations thereof; and
    from 1 ppt to 500 ppt of a viscosifier comprising a component selected from the group consisting of clay, graphite, carbon nanotubes, metallic oxide nanoparticles, nanoparticles, and combinations thereof,
        where the gelled hydrocarbon fracturing fluid has a viscosity of greater than 200 cP at 200° F. and 100 $s^{-1}$ shear, and
        where the gelled hydrocarbon fracturing fluid has a viscosity of greater than 250 cP at 240° F. and 100 $s^{-1}$ shear.

2. The gelled hydrocarbon fracturing fluid of claim 1, where the hydrocarbon fluid comprises diesel fuel or crude oil.

3. The gelled hydrocarbon fracturing fluid of claim 1, where the crosslinker comprises a polyvalent metal salt of iron, aluminum, or combinations thereof.

4. The gelled hydrocarbon fracturing fluid of claim 1, where the crosslinker comprises ferric iron ($Fe^{3+}$), aluminum chloride, aluminum isopropoxide, or combinations thereof.

5. The gelled hydrocarbon fracturing fluid of claim 1, where the clay comprises montmorillonite clay.

6. The gelled hydrocarbon fracturing fluid of claim 1, where the metallic oxide nanoparticles comprise zirconium oxide ($ZrO_2$) nanoparticles.

7. A method of treating a subterranean formation, the method comprising:
    contacting the subterranean formation with the gelled hydrocarbon fracturing fluid of claim 1; and
    generating at least one fracture in the subterranean formation.

8. The method of claim 7, where the crosslinker comprises a polyvalent metal salt of iron, aluminum, or combinations thereof.

9. The method of claim 7, where the crosslinker comprises ferric iron ($Fe^{3+}$), aluminum chloride, aluminum isopropoxide, or combinations thereof.

10. The method of claim 7, where the viscosifier comprises montmorillonite clay or zirconium oxide ($ZrO_2$) nanoparticles.

11. The gelled hydrocarbon fracturing fluid of claim 1, where the gelled hydrocarbon fracturing fluid comprises less than 10 gpt of the phosphate ester, less than 10 gpt of the crosslinker, and from 15 ppt to 35 ppt of the viscosifier.

12. A gelled hydrocarbon fracturing fluid comprising
    a hydrocarbon fluid;
    from 1 gpt to 100 gpt of a phosphate ester;
    a crosslinker comprising a component selected from the group consisting of iron, aluminum, and combinations thereof; and
    a viscosifier comprising montmorillonite clay,
        where the gelled hydrocarbon fracturing fluid has a viscosity of greater than 200 cP at 200° F. and 100 $s^{-1}$ shear, and
        where the gelled hydrocarbon fracturing fluid has a viscosity of greater than 250 cP at 240° F. and 100 $s^{-1}$ shear.

13. The gelled hydrocarbon fracturing fluid of claim 12, where the hydrocarbon fluid comprises diesel fuel or crude oil.

14. The gelled hydrocarbon fracturing fluid of claim 12, where the gelled hydrocarbon fracturing fluid comprises from 1 gpt to 100 gpt of the crosslinker.

15. The gelled hydrocarbon fracturing fluid of claim 12, where the crosslinker comprises a polyvalent metal salt of iron, aluminum, or combinations thereof.

16. The gelled hydrocarbon fracturing fluid of claim 12, where the crosslinker comprises ferric iron ($Fe^{3+}$), aluminum chloride, aluminum isopropoxide, or combinations thereof.

17. The gelled hydrocarbon fracturing fluid of claim 12, where the gelled hydrocarbon fracturing fluid comprises less than 10 gpt of the phosphate ester, from 1 gpt to 10 gpt of the crosslinker, and from 15 ppt to 35 ppt of the viscosifier.

* * * * *